US012591638B1

(12) United States Patent
    Craggs

(10) Patent No.: US 12,591,638 B1
(45) Date of Patent: Mar. 31, 2026

(54) OFFLINE LICENSE VALIDATOR

(71) Applicant: AppDirect, Inc., San Francisco, CA (US)

(72) Inventor: Daniel P. Craggs, Montreal (CA)

(73) Assignee: AppDirect, Inc., San Francisco, CA (US)

( * ) Notice: Subject to any disclaimer, the term of this patent is extended or adjusted under 35 U.S.C. 154(b) by 194 days.

(21) Appl. No.: 17/037,437

(22) Filed: Sep. 29, 2020

Related U.S. Application Data

(60) Provisional application No. 62/908,519, filed on Sep. 30, 2019.

(51) Int. Cl.
| | |
|---|---|
| *G06F 21/10* | (2013.01) |
| *G06K 7/10* | (2006.01) |
| *G06Q 20/12* | (2012.01) |
| *G06Q 30/018* | (2023.01) |
| *H04L 9/08* | (2006.01) |
| *H04W 4/06* | (2009.01) |

(52) U.S. Cl.
CPC ....... *G06F 21/105* (2013.01); *G06K 7/10297* (2013.01); *G06Q 20/127* (2013.01); *G06Q 30/0185* (2013.01); *H04L 9/085* (2013.01); *H04W 4/06* (2013.01); *G06F 21/1076* (2023.08)

(58) Field of Classification Search
None
See application file for complete search history.

(56) References Cited

U.S. PATENT DOCUMENTS

| | | | | |
|---|---|---|---|---|
| 7,191,155 | B2 * | 3/2007 | Maruyama | G06F 21/00 |
| | | | | 380/47 |
| 7,680,743 | B2 * | 3/2010 | Peinado | G06F 21/10 |
| | | | | 726/32 |
| 10,417,399 | B2 * | 9/2019 | Wajs | H04N 21/2541 |
| 2006/0064582 | A1 * | 3/2006 | Teal | G06F 21/105 |
| | | | | 713/156 |
| 2006/0106727 | A1 * | 5/2006 | Yellai | H04L 9/08 |
| | | | | 375/E7.009 |
| 2006/0106728 | A1 * | 5/2006 | Yellai | G06F 21/105 |
| | | | | 705/59 |
| 2007/0219917 | A1 * | 9/2007 | Liu | G06F 21/10 |
| | | | | 705/59 |
| 2008/0240447 | A1 * | 10/2008 | Zhu | H04L 9/3271 |
| | | | | 380/30 |
| 2009/0119779 | A1 * | 5/2009 | Dean | G06F 21/128 |
| | | | | 717/174 |

(Continued)

*Primary Examiner* — Rupal Dharia
*Assistant Examiner* — Shadi H Kobrosli
(74) *Attorney, Agent, or Firm* — McDermott Will & Schulte LLP

(57) ABSTRACT

Methods, systems, and storage media for offline license validation are disclosed. Exemplary implementations may: receive, at a server, a first public identifier of an offline device; identify the offline device based on the first public identifier; determine the offline device has an invalid license; determine the offline device has a valid license; generate a second public identifier for the offline device based on a second shared secret; generate a second public identifier to be broadcast to the offline device based on a second shared secret; broadcast, through the online device, the second public identifier to the offline device; and broadcast, through the online device, the second public identifier to the offline device.

20 Claims, 8 Drawing Sheets

(56)     References Cited

U.S. PATENT DOCUMENTS

| | | | | |
|---|---|---|---|---|
| 2014/0047558 | A1* | 2/2014 | Veerubhotla | G06Q 20/1235 |
| | | | | 726/28 |
| 2014/0207909 | A1* | 7/2014 | Yellai | G06Q 20/1235 |
| | | | | 709/217 |
| 2014/0380499 | A1* | 12/2014 | Pruss | G06F 21/62 |
| | | | | 726/27 |
| 2015/0220719 | A1* | 8/2015 | Kawada | H04W 12/08 |
| | | | | 726/20 |
| 2017/0024549 | A1* | 1/2017 | Bushman | G06F 8/65 |
| 2017/0286711 | A1* | 10/2017 | Negrea | H04L 63/10 |
| 2018/0114030 | A1* | 4/2018 | Sullivan | H04L 9/30 |
| 2019/0026442 | A1* | 1/2019 | Perlman | H04L 9/3247 |
| 2019/0065704 | A1* | 2/2019 | Giffard-Burley | H04L 63/0823 |
| 2019/0114398 | A1* | 4/2019 | Lei | G06F 21/12 |
| 2020/0034172 | A1* | 1/2020 | Wu | G06F 9/45558 |
| 2020/0394284 | A1* | 12/2020 | Hiratsuka | H04L 9/3242 |
| 2021/0081514 | A1* | 3/2021 | Hiratsuka | H04L 9/3236 |
| 2022/0318345 | A1* | 10/2022 | Bingham | G06F 21/105 |

* cited by examiner

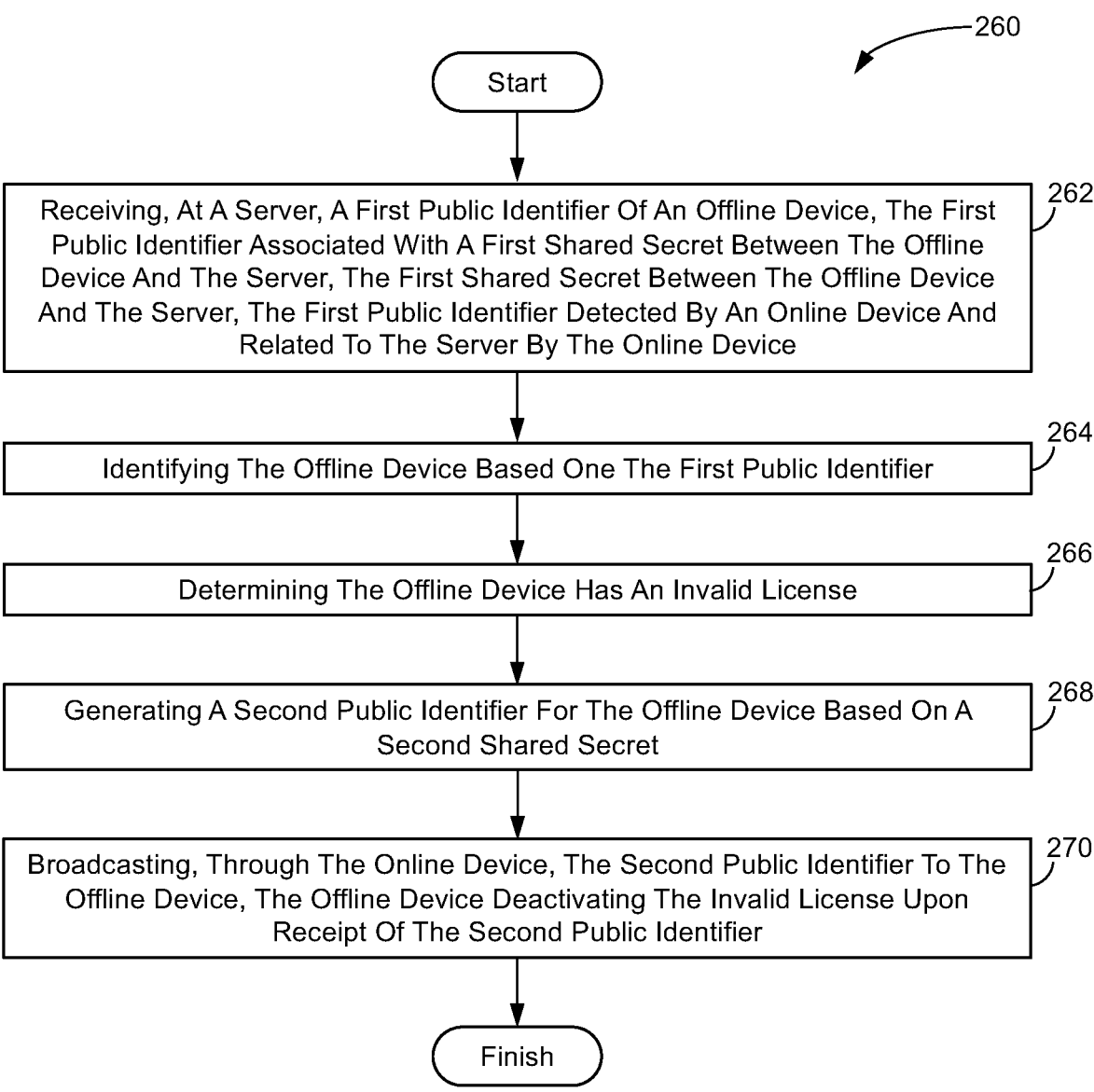

—260

Start

Receiving, At A Server, A First Public Identifier Of An Offline Device, The First Public Identifier Associated With A First Shared Secret Between The Offline Device And The Server, The First Shared Secret Between The Offline Device And The Server, The First Public Identifier Detected By An Online Device And Related To The Server By The Online Device                                                                                         262

Identifying The Offline Device Based One The First Public Identifier                    264

Determining The Offline Device Has An Invalid License                    266

Generating A Second Public Identifier For The Offline Device Based On A Second Shared Secret                    268

Broadcasting, Through The Online Device, The Second Public Identifier To The Offline Device, The Offline Device Deactivating The Invalid License Upon Receipt Of The Second Public Identifier                    270

Finish

Start

Receive, At Server, First Public Identifier Of Offline Device    402

Identify Offline Device Based On First Public Identifier    404

Determine Offline Device Has Invalid License    406

Generate Second Public Identifier For Offline Device Based On Second Shared Secret    408

Broadcast, Through Online Device, Second Public Identifier To Offline Device    410

Finish

—500

Start

Receive, At Server, First Public Identifier Of Offline Device    502

Identify Offline Device Based On First Public Identifier    504

Determine Offline Device Has Valid License    506

Generate Second Public Identifier To Be Broadcast To Offline Device Based On Second Shared Secret    508

Broadcast, Through Online Device, Second Public Identifier To Offline Device    510

Finish

OFFLINE LICENSE VALIDATOR

CROSS-REFERENCE TO RELATED APPLICATION

This present application claims the benefit of priority under 35 U.S.C. § 119(e) to U.S. Provisional Application No. 62/908,519, filed Sep. 30, 2019, the disclosure of which is hereby incorporated by reference in its entirety for all purposes.

TECHNICAL FIELD

The present disclosure generally relates to validation, and more particularly to offline license validation.

BACKGROUND

Online services offer advantages to both the user (e.g., always up-to-date software) and the provider (e.g., better control over licensing). Online services may be offered on a subscription basis which are billed to the user on a recurring basis. As long as the user pays the subscription fee, the license is valid and the user can access the services.

Online services often allow offline access so that a device can still use the services, at least in some capacity, when they do not have access to internet (e.g., on flights, ran out of cellular data, etc.). However, this may be exploited by some users to circumvent expired licenses. For example, a user may leave their device offline to avoid their license being invalidated when a subscription expires.

Conventional techniques to prevent circumventing licenses when offline usually require the user to go online within a certain time to re-validate the license. This is unreliable as the user may not go online to re-validate before the license expires. If the user keeps the device offline and continues to use the service, it creates a window in which a user may effectively "extend their license" without paying for the subscription.

BRIEF SUMMARY

The subject disclosure addresses shortcomings in existing technologies by providing for offline license validation. Online services provide offline access so that a device can use their services when they do not have access to internet. However, this may be exploited to circumvent verifications for premium license checks as a user may leave their device offline to avoid their license being invalidated. Conventional techniques for solving this problem usually require the user to go online within a certain time period to re-validate the license. This is unreliable as it depends on forcing the user to go online, and also allows a user to extend their premium services for longer than the provider intended. Clients may run peer validations via local connectivity technology (e.g., wireless communications) for offline validation. For example, an offline client broadcasts an identifier that indicates a premium service. An online client may read identifiers broadcast by offline clients. The online client submits the identifier to a server for license verification. If the license is invalid, the server provides the online client with a second identifier to broadcast. The offline client scans for this second identifier, and after detecting the second identifier, the offline deactivates the license so that the user must go back online to reactivate the premium service.

One aspect of the present disclosure relates to a method for offline license validation. The method may include receiving, at a server, a first public identifier of an offline device. The first public identifier may be associated with a first shared secret between the offline device and the server. The first public identifier detected by an online device and relayed to the server by the online device. The method may include identifying the offline device based on the first public identifier. The method may include determining the offline device has an invalid license. The method may include generating a second public identifier for the offline device based on a second shared secret. The method may include broadcasting, through the online device, the second public identifier to the offline device. The offline device may deactivate the invalid license upon receipt of the second public identifier.

Another aspect of the present disclosure relates to a method for offline license validation. The method may include receiving, at a server, a first public identifier of an offline device. The first public identifier may be associated with a first shared secret between the offline device and the server. The first public identifier detected by an online device and relayed to the server by the online device. The method may include identifying the offline device based on the first public identifier. The method may include determining the offline device has a valid license. The method may include generating a second public identifier to be broadcast to the offline device based on a second shared secret. The method may include broadcasting, through the online device, the second public identifier to the offline device. The offline device may activate the valid license upon receipt of the second public identifier.

Yet another aspect of the present disclosure relates to a system configured for offline license validation. The system may include one or more hardware processors configured by machine-readable instructions. The processor(s) may be configured to receive, at a server, a first public identifier of an offline device. The first public identifier may be associated with a first shared secret between the offline device and the server. The first public identifier detected by an online device and relayed to the server by the online device. The processor(s) may be configured to identify the offline device based on the first public identifier. The processor(s) may be configured to determine the offline device has an invalid license. The processor(s) may be configured to determine the offline device has a valid license. The processor(s) may be configured to generate a second public identifier for the offline device based on a second shared secret. The processor(s) may be configured to generate a second public identifier to be broadcast to the offline device based on a second shared secret. The processor(s) may be configured to broadcast, through the online device, the second public identifier to the offline device. The offline device may deactivate the invalid license upon receipt of the second public identifier. The processor(s) may be configured to broadcast, through the online device, the second public identifier to the offline device. The offline device may activate the valid license upon receipt of the second public identifier.

Still another aspect of the present disclosure relates to a non-transient computer-readable storage medium having instructions embodied thereon, the instructions being executable by one or more processors to perform a method for offline license validation. The method may include receiving, at a server, a first public identifier of an offline device. The first public identifier may be associated with a first shared secret between the offline device and the server. The first public identifier detected by an online device and relayed to the server by the online device. The method may include identifying the offline device based on the first public identifier. The method may include determining the offline device has an invalid license. The method may include determining the offline device has a valid license. The method may include generating a second public identifier for the offline device based on a second shared secret. The method may include generating a second public identifier to be broadcast to the offline device based on a second shared secret. The method may include broadcasting, through the online device, the second public identifier to the offline device. The offline device may deactivate the invalid license upon receipt of the second public identifier. The method may include broadcasting, through the online device, the second public identifier to the offline device. The offline device may activate the valid license upon receipt of the second public identifier.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
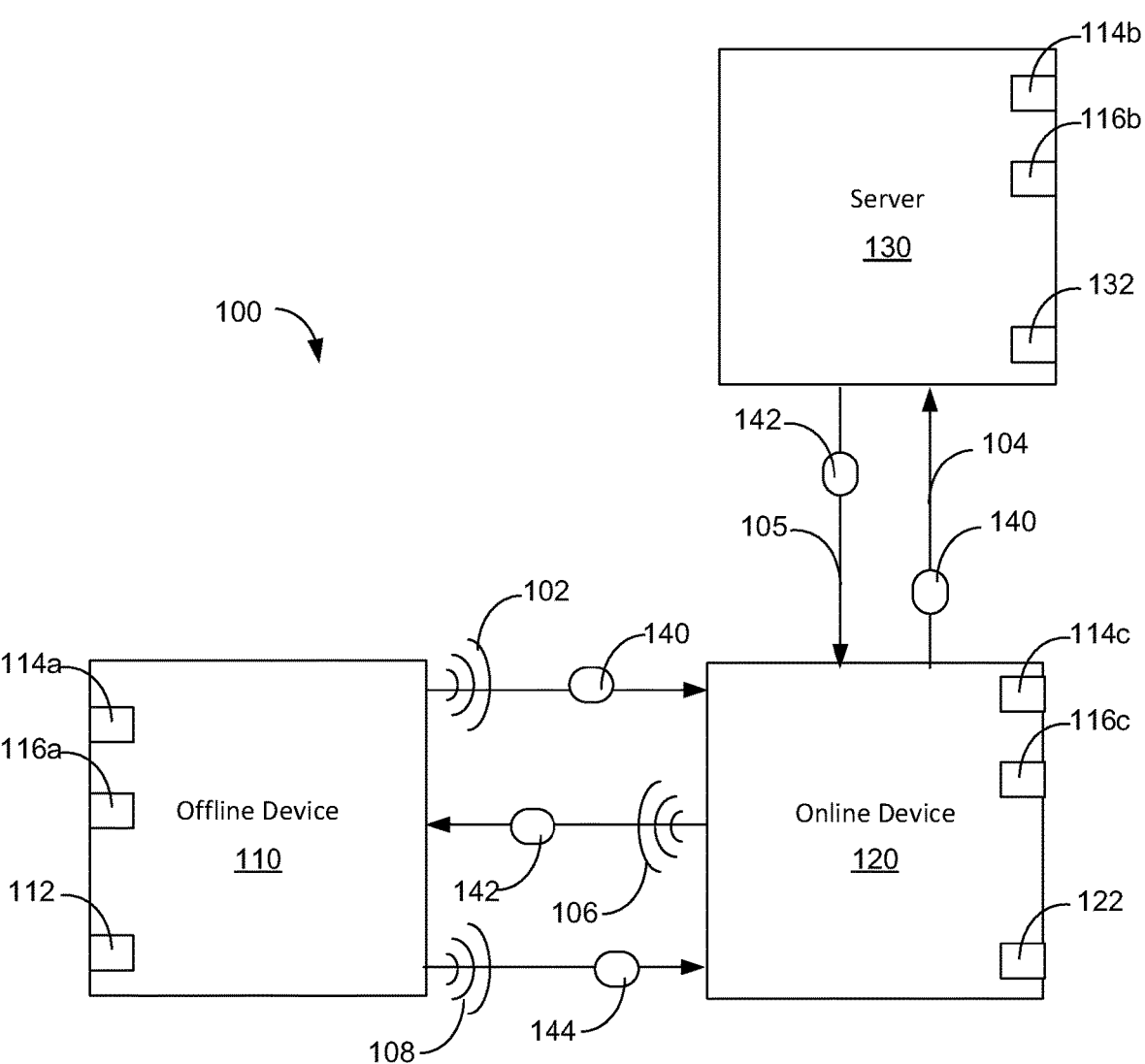
FIG. 1 is a system configured for offline license validation, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Online services often provide offline access so that a device can still use their services in some capacity when they do not have access to internet (e.g., on flights, ran out of cellular data, etc.). However, this may be exploited to circumvent verifications for premium license checks as a user may leave their device offline to avoid their license being invalidated. Conventional techniques for solving this problem is usually to require the user to go online within a certain time period to re-validate the license. This is unreliable as it depends on forcing the user to go online, and also creates a window in which a user may extend their premium services for longer than the provider intended. Therefore, it is desirable to avoid these situations by validating licenses offline.

According to aspects, clients may run peer validations via Bluetooth Low Energy (BLE), or through any other local connectivity technology (e.g., wireless communications). For example, if a client chooses to be offline, then they may be obligated to broadcast a universally unique identifier (UUID) via BLE that contains an identifier (e.g., a simple prefix identifier) that indicates it is operating for the purposes of a premium service. The rest of the UUID can be based on a shared secret between the client and the server. For example, the UUID may involve a time-based one-time password algorithm as known in the art.

According to aspects, an online client may not be required to broadcast a UUID, but it may be configured to read nearby UUIDs. For example, if there's a nearby UUID that is identified as subscribing to a premium service, then the online client submits this UUID to the server for license verification. If the license is invalid, the server will provide the online client with a UUID to be broadcast that is based on a second secret shared with the offline client.

According to aspects, the offline client, while broadcasting its own UUID, may calculate a second UUID based on its second shared secret and be regularly scanning for it. Once it detects this second UUID being broadcast, then the license is deactivated and the user must go back online to reactivate the premium service.

According to aspects, a server shares two secrets with Client A. The server may also share two secrets (e.g., different secrets than those shared with Client A) with Client B. Client A goes online, and Client B goes offline. Client B broadcasts a first UUID based on a first shared secret and a public UUID identifier. Client A scans for the first UUID with the public UUID identifier. Client A detects the first UUID and submits it to the server. The server identifies the first UUID based on the first secret shared with Client B and detects an invalid license. The server generates a second UUID based on a second secret shared with Client B and sends it to Client A. Client A broadcasts the second UUID. Client B calculates the second UUID based on the second shared secret and scans for it locally. Client B detects matching UUIDs. Client B deactivates license.

According to additional aspects, an offline client may not be obligated to enable wireless communications (e.g., Bluetooth Low Energy (BLE)) if the offline client is not subscribed to premium services (e.g., only using free features). For example, an online client may be configured to scan for offline clients regardless of whether the online client is using a free license or a premium license, whereas an offline client not having a premium license may not be obligated to broadcast its UUID while offline.

FIG. 1 is a system 100 configured for offline license validation, according to certain aspects of the present disclosure. The system 100 may include an offline device 110, and online device 120, and a server 130. The online device 120 is local to or in the vicinity of the offline device 110. That is, the online device 120 and the offline device 110 are within a local communications or broadcast range of one another. The online device 120 is also communicatively coupled (e.g., via a network connection) to the server 130.

By "online" it is meant that the online device 120 has a communications connection with the server 130, whether that be always-on, intermittent, or otherwise. By "offline" it is meant that the offline device 110 does not have a communications connection with the server 130, and instead relays communications with the server via the online device 120.

The offline device 110 is configured to go online from time to time, but that for purposes of this disclosure, the offline device 110 is offline (does not have a connection to the server 130) during the operations described herein. For example, the offline device 110 may be a user's mobile device which is generally connected to a communications network (is "online"), but may go offline from time to time either by user choice (e.g., the user turning off mobile communications) or because an online connection is not available (e.g., the user is on an airplane).

Likewise, the online device 120 may be configured to go offline (disconnect communications with the server 130) from time to time, but that for purposes of this disclosure, the online device 120 is in communications with the server 130 for the operations described herein that involve communications with the server 130.

According to aspects, the offline device 110 is subscribed to premium services granted by a license 112. The user may desire to access the premium services even while offline. In order to validate licenses for premium services, the server 130 maintains a license validation record 132. For example, the license validation record 132 may be updated to record a valid license when the user's payment is processed for the premium service. The license validation record 132 may also be updated to record an invalid license, for example when the user's subscription is not renewed.

The user of the offline device 110 may desire to continue using the premium services even when the offline device 110 is offline and does not have a connection (e.g., internet) to the server 130 to validate the license 112. The server 130 may still validate that the offline device 110 has a valid license for the premium service, via the online device 120.

When the offline device 110 is subscribed to a premium service and goes offline, it enables wireless communications (e.g., Bluetooth Low Energy (BLE)). This allows the offline device 110 to continue in local communication with the online device 120 (e.g., via broadcasts). The online device 120 relays communications between the offline device 110 and the server 130.

In an implementation, the offline device 110 may broadcast 102 a first public identifier 140 while offline. The online device 120 may be configured to scan for the first public identifier 140 broadcast 102 by the offline device 110. When the online device 120 detects the first public identifier 140, the online device 120 compares the first public identifier 140 with a record of associated devices 122 that the online device 120 is monitoring. If the first public identifier 140 is from the offline device 110 that the online device 120 is monitoring, the online device 120 relays 104 the first public identifier 140 to the server 130.

According to aspects, the first public identifier 140 is a universally unique identifier (UUID). The server 130 determines whether the offline device is operating a premium service as indicated by a prefix of the UUID, and a remainder of the UUID is based on the first shared secret. The online device scans for UUIDs broadcast by the offline device 110. The online device only submits the UUID to the server 130 for license validation responsive to a matching UUID being discovered.

According to aspects, the first public identifier 140 may be associated with a first shared secret 114a-114b between the offline device 110 and the server 130 so that the offline device 110 may be identified by the server 130 based on the first public identifier 140.

In an implementation, the server 130 determines if the offline device 110 has an invalid license. The server 130 generates a second public identifier 142 for the offline device 110 based on a second shared secret 116a, 116b and returns 105 the second public identifier 142 to the online device 120. The online device 120 broadcasts 106 the second public identifier 142 to the offline device 110. The offline device 110 deactivates the invalid license 112 upon receipt of the second public identifier.

In an implementation, the online device 120 determines that the offline device 110 has a valid license 112. The server 130 generates a second public identifier 142 to be broadcast by the online device 120 to the offline device 110 based on the second shared secret 116a, 116b. The online device 120 broadcasts the second public identifier 142 to the offline device 110. The offline device 110 activates the valid license 112 upon receipt of the second public identifier 142.

According to aspects, the server 130 enables the offline device 110 to activate the premium license 112 without an online connection based on validation of the premium license 112 by the server 130.

According to aspects, the offline device 110 independently determines a second public identifier 144 based on the second shared secret 116b. The offline device 110 activates or deactivates the invalid license 112 when the second public identifier 144 that was independently determined by the offline device 110 matches the second public identifier 142 broadcast through the online device 120. The offline device 110 then broadcasts 108 the second public identifier 144.

According to aspects, the online device 120 continues to scan until the second public identifier 144 broadcast 108 by the offline device 110 matches the second public identifier 142 broadcast 106 through the online device 120.

According to aspects, the server 130 shares at least a first secret 114a, 114b and a second secret 116a, 116b with the offline device 110. The server 130 also shares a different first secret 114a, 114c and a different second secret 114a, 114c with the online device 120. In other aspects, the secrets 114a-c, 116a-c are the same between all of the offline device 110, the online device 120, and the server 130.

According to aspects, the offline device 110 is required to enable wireless communications if the offline device 110 is subscribed to a premium license 112.

According to aspects, the offline device 110 is not required to enable wireless communications if the offline device 110 is subscribed to a free license. The online device 120 is configured to scan for offline devices regardless of whether the offline device 110 is using a free license or a premium license.

According to aspects, the second public identifier 142 is an updated public identifier. The updated public identifier is only broadcast by the online device 120 if the license 112 is not valid.

According to aspects, the online device 120 continues to scan responsive to the license 112 being valid.

Figure 2A:
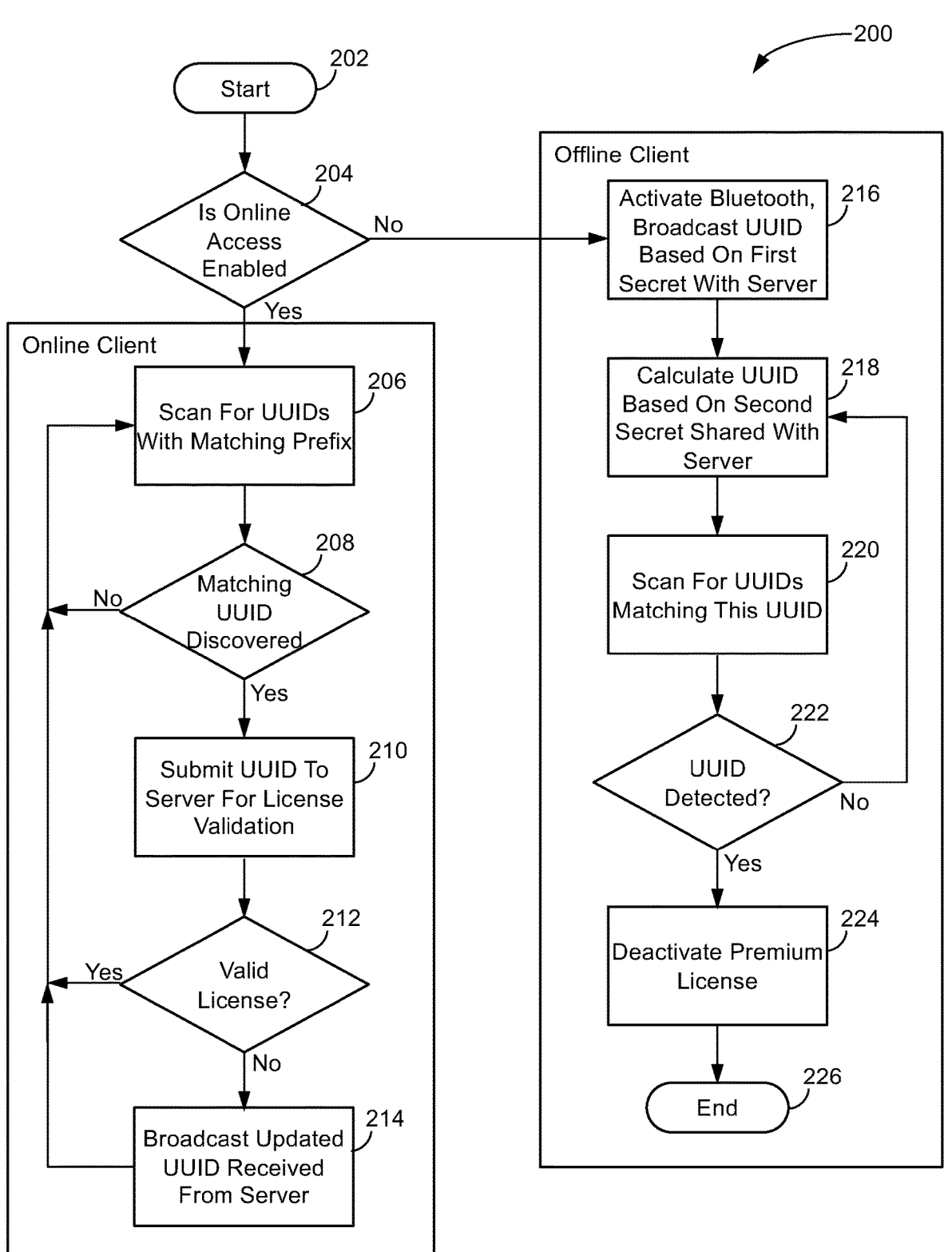
FIGS. 2A, 2B, and/or 2C illustrate example process flows for offline license validation, according to certain aspects of the present disclosure.
Figure 2B:
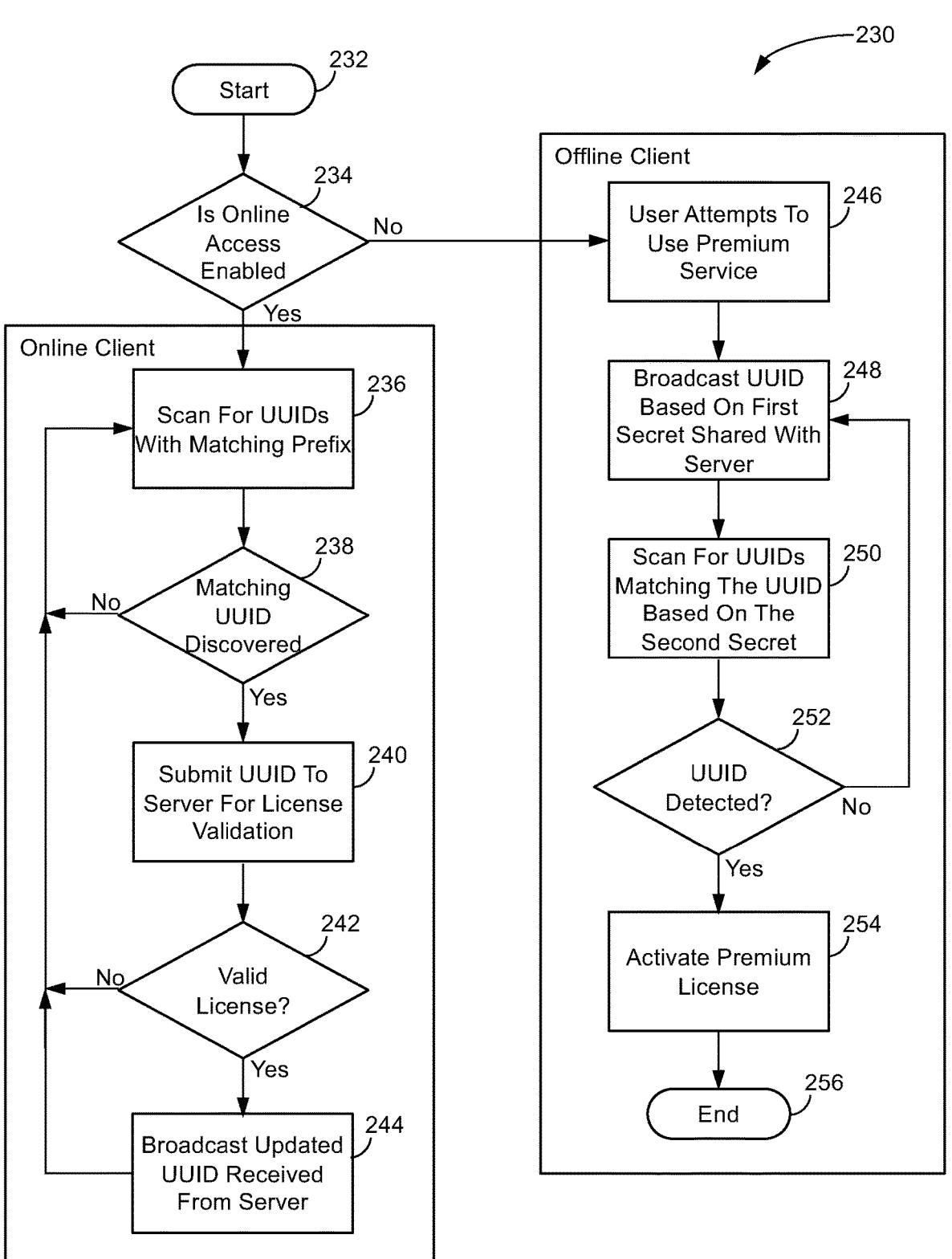

FIGS. 2A, 2B, and/or 2C illustrate example process flows for offline license validation, according to certain aspects of the present disclosure.

In FIG. 2A, a process 200 begins 202 by determining whether online access is enabled 204. If yes, then an online client scans for UUIDs with a matching prefix to a UUID being broadcast by an offline client 206. If a matching UUID is discovered 208, then the UUID is submitted to a server for license validation 210. If not, then the online client continues scanning 206. If the license is not valid 212, then the online client broadcasts an updated UUID that is received from the server 214. If the license is valid, then the online client continues scanning 206.

According to aspects, if online access is not enabled 204, then an offline client activates Bluetooth (e.g., BLE or any other form of wireless communication) and broadcasts a UUID that is based on a first shared secret with a server 216. A second UUID is calculated based on a second shared secret with the server 218. The offline client scans for UUIDs matching the second UUID 220. If a match to the second UUID is detected 222, then the offline client deactivates a premium license 224 and the process ends 226. If not then the second UUID is calculated based on the second shared secret with the server 218 and the offline client continues to scan.

In FIG. 2B a process 230 begins 232 by determining whether online access is enabled 234. If yes, then an online client scans for UUIDs with a matching prefix to a UUID being broadcast by an offline client 236. If a matching UUID is discovered 238, then the UUID is submitted to a server for license validation 240. If not, then the online client continues scanning 236. If the license is not valid 242, then the online client continues scanning 236. If the license is valid, then the online client broadcasts an updated UUID that is received from the server 244.

According to aspects, if online access is not enabled 234, an offline client may attempt to use a premium service 246. The offline client may broadcast a UUID based on a first shared secret with the server 248. The offline client scans for UUIDs matching a second UUID based on a second shared secret 250. If a match to the second UUID is detected 252, then the offline client activates a premium license 254 and the process ends 256. If not, then the process goes back to step 248.

For explanatory purposes, the example process 260 of FIG. 2C is described herein with reference to FIGS. 2A-2B. Further for explanatory purposes, some blocks of the example process of FIG. 2C are described herein as occurring in series, or linearly. However, multiple blocks of the example process of FIG. 2C may occur in parallel. In addition, the blocks of the example process of FIG. 2C need not be performed in the order shown and/or one or more of the blocks of the example process of FIG. 2C need not be performed.

At block 262, a server may receive a first public identifier of an offline device. The first public identifier may be associated with a first shared secret between the offline device and the server. The first public identifier may be detected by an online device and relayed to the server by the online device. At block 264, the offline device may be identified based on the first public identifier. At block 266, the server may determine that the offline device has an invalid license. At block 268, a second public identifier may be generated for the offline device based on a second shared secret. At block 270, the online device may broadcast the second public identifier to the offline device. The offline device may deactivate the invalid license upon receipt of the second public identifier.

According to aspects, the process 260 may include receiving a UUID of an offline device (e.g., step 210 of FIG. 2A). The UUID may be associated with a shared secret between the server and the offline device (e.g., steps 242-250 of FIG. 2B). An online device may be configured to relay the UUID of the offline device to the server (e.g., steps 206-214 of FIG. 2A). The offline device is identified and determined to have an invalid license (e.g., steps 206-214 of FIG. 2A). A new UUID may be generated based on a second shared secret between the server and the offline device (e.g., step 218 of FIG. 2A). The online device broadcasts the new UUID to the offline device and the offline device deactivates the invalid license upon receiving the new UUID (e.g., steps 216-226 of FIG. 2A).

Figure 3:
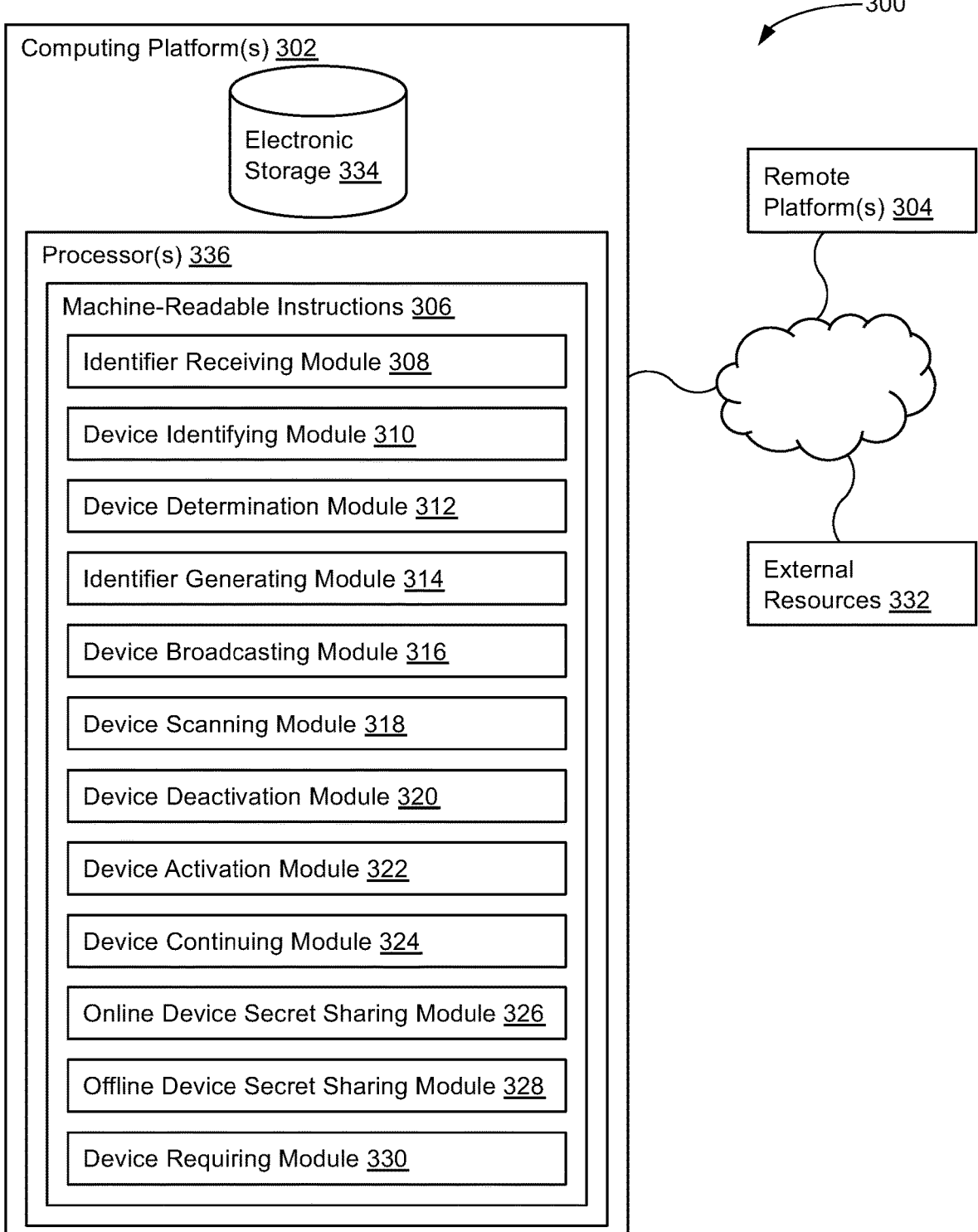
FIG. 3 illustrates a system configured for offline license validation, according to certain aspects of the disclosure.

FIG. 3 illustrates a system 300 configured for offline license validation, according to certain aspects of the disclosure. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of identifier receiving module 308, device identifying module 310, device determination module 312, identifier generating module 314, device broadcasting module 316, device scanning module 318, device deactivation module 320, device activation module 322, device continuing module 324, online device secret sharing module 326, offline device secret sharing module 328, device requiring module 330, and/or other instruction modules.

Identifier receiving module 308 may be configured to receive, at a server, a first public identifier of an offline device. It is noted that the term "identifier" as used herein is not limited to any particular type or format of identifier. For example, the identifier is not limited to the UUID described herein for purposes of illustration and may include any unique sequence (e.g., sequence of characters) used to identify or refer to an element, such as a variable or a set of data.

The offline device may be not required to enable wireless communications if the offline device is subscribed to a free license. It is noted that the term "license" as used herein is not limited to any particular type or format of license. The term license may refer to any permission or permit to access or otherwise use a service on the offline device granted by a party to another party (e.g., the user) pursuant to an agreement between the parties. The license may be valid so long as the user complies with the terms of the agreement (e.g., by paying a subscription fee), and may be invalid when the user fails to comply with the terms of the agreement (e.g., by allowing a subscription to end).

The first public identifier may be associated with a first shared secret between the offline device and the server. The term "secret" as used herein is not limited to any particular type or format of secret. The secret may be any information (or part of information) or parameter that encrypts and decrypts messages. The secret may be symmetric, asymmetric, secret-key, or encrypted such that only the intended recipient can decrypt the secret.

The first public identifier detected by an online device and relayed to the server by the online device. The online device may be configured to scan for offline devices regardless of whether the offline device is using a free license or a premium license. The term "premium license" as used herein is not limited to any particular type or format of license. The premium license may be any license for which the grantor wants to ensure compliance with the license terms. Generally, a premium license refers to a paid-for or subscribed-to license. However, the grantor of a free license may also want to track compliance with a free license, and hence the term "premium license" would also refer to a free license that the grantor is desiring to ensure compliance by the end-user.

The updated public identifier only broadcast by the online device if the license may be not valid.

Device identifying module 310 may be configured to identify the offline device based on the first public identifier.

Device determination module 312 may be configured to determine the offline device has an invalid license.

Device determination module 312 may be configured to determine the offline device has a valid license.

Device determination module 312 may be configured to determine the offline device is operating a premium service as indicated by a prefix of the universally unique identifier. A remainder of the universally unique identifier may be based on the first shared secret. It is noted that the term "remainder" as used herein means any portion of the identifier in addition to or as an extension to the prefix.

Device determination module 312 may be configured to independently determine, through the offline device, the second public identifier based on the second shared secret.

Identifier generating module 314 may be configured to generate a second public identifier for the offline device based on a second shared secret.

Identifier generating module 314 may be configured to generate a second public identifier to be broadcast to the offline device based on a second shared secret. The second public identifier may be an updated public identifier.

Identifier generating module 314 may be configured to generate the first public identifier as a universally unique identifier.

Device broadcasting module 316 may be configured to broadcast, through the online device, the second public identifier to the offline device. The offline device may deactivate the invalid license upon receipt of the second public identifier.

Device broadcasting module 316 may be configured to broadcast, through the online device, the second public identifier to the offline device. The offline device may activate the valid license upon receipt of the second public identifier.

Device scanning module 318 may be configured to scan, through the online device, for universally unique identifiers broadcast by the offline device. The online device only may submit the universally unique identifier to the server for license validation responsive to a matching universally unique identifier being discovered. It is noted that the term "validation" as used herein to refer to license validation is not limited to any particular process or processes. The license may be validated according to any suitable algorithm, such as but not limited to, comparing a license to a database of active licenses, or otherwise checking, proving, or supporting compliance with one or more term(s) of the license.

Device deactivation module 320 may be configured to deactivate, through the offline device, the invalid license when the second public identifier independently determined by the offline device matches the second public identifier that is broadcast through the online device.

Device activation module 322 may be configured to activate, through the offline device, the valid license responsive to the second public identifier independently determined by the offline device matching the second public identifier broadcast through the online device.

Device continuing module 324 may be configured to continue to scan, through the offline device, until the second public identifier independently determined by the offline device matches the second public identifier broadcast through the online device.

Device continuing module 324 may be configured to continue to scan, through the online device, responsive to the license being valid.

Online device secret sharing module 326 may be configured to share, at the server, at least a first secret and a second secret with the online device.

Offline device secret sharing module 328 may be configured to share, at the server, at least a different first secret and a different second secret with the offline device.

Device requiring module 330 may be configured to require the offline device to enable wireless communications if the offline device is subscribed to a premium license. The server may enable the offline device to activate premium license without an online connection based on validation of the premium license by the server. It is noted that the term "online connection" as used herein refers to a connection to the server, whether that connection is via internet, wide-area-network or WAN, local-area-network or LAN, mobile device connection (e.g., 3G, 4G, 5G, etc.) or other communications protocol now known or later developed.

In some implementations, computing platform(s) 302, remote platform(s) 304, and/or external resources 332 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 332 may be operatively linked via some other communication media.

A given remote platform 304 may include one or more processors configured to execute computer program modules. The computer program modules may be configured to enable an expert or user associated with the given remote platform 304 to interface with system 300 and/or external resources 332, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 332 may include sources of information outside of system 300, external entities participating with system 300, and/or other resources. In some implementations, some or all of the functionality attributed herein to external resources 332 may be provided by resources included in system 300.

Computing platform(s) 302 may include electronic storage 334, one or more processors 336, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 334 may comprise non-transitory storage media that electronically stores information. The electronic storage media of electronic storage 334 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 334 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 334 may include one or more virtual storage resources (e.g., cloud storage, a virtual private network, and/or other virtual storage resources). Electronic storage 334 may store software algorithms, information determined by processor(s) 336, information received from computing platform(s) 302, information received from remote platform(s) 304, and/or other information that enables computing platform(s) 302 to function as described herein.

Processor(s) 336 may be configured to provide information processing capabilities in computing platform(s) 302. As such, processor(s) 336 may include one or more of a digital processor, an analog processor, a digital circuit designed to process information, an analog circuit designed to process information, a state machine, and/or other mechanisms for electronically processing information. Although processor(s) 336 is shown in FIG. 3 as a single entity, this is for illustrative purposes only. In some implementations, processor(s) 336 may include a plurality of processing units. These processing units may be physically located within the same device, or processor(s) 336 may represent processing functionality of a plurality of devices operating in coordination. Processor(s) 336 may be configured to execute modules 308, 310, 312, 314, 316, 318, 320, 322, 324, 326, 328, and/or 330, and/or other modules. Processor(s) 336 may be configured to execute modules 308, 310, 312, 314, 316, 318, 320, 322, 324, 326, 328, and/or 330, and/or other modules by software; hardware; firmware; some combination of software, hardware, and/or firmware; and/or other mechanisms for configuring processing capabilities on processor(s) 336. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, 324, 326, 328, and/or 330 are illustrated in FIG. 3 as being implemented within a single processing unit, in implementations in which processor(s) 336 includes multiple processing units, one or more of modules 308, 310, 312, 314, 316, 318, 320, 322, 324, 326, 328, and/or 330 may be implemented remotely from the other modules. The description of the functionality provided by the different modules 308, 310, 312, 314, 316, 318, 320, 322, 324, 326, 328, and/or 330 described below is for illustrative purposes, and is not intended to be limiting, as any of modules 308, 310, 312, 314, 316, 318, 320, 322, 324, 326, 328, and/or 330 may provide more or less functionality than is described. For example, one or more of modules 308, 310, 312, 314, 316, 318, 320, 322, 324, 326, 328, and/or 330 may be eliminated, and some or all of its functionality may be provided by other ones of modules 308, 310, 312, 314, 316, 318, 320, 322, 324, 326, 328, and/or 330. As another example, processor(s) 336 may be configured to execute one or more additional modules that may perform some or all of the functionality attributed below to one of modules 308, 310, 312, 314, 316, 318, 320, 322, 324, 326, 328, and/or 330.

Figure 4:
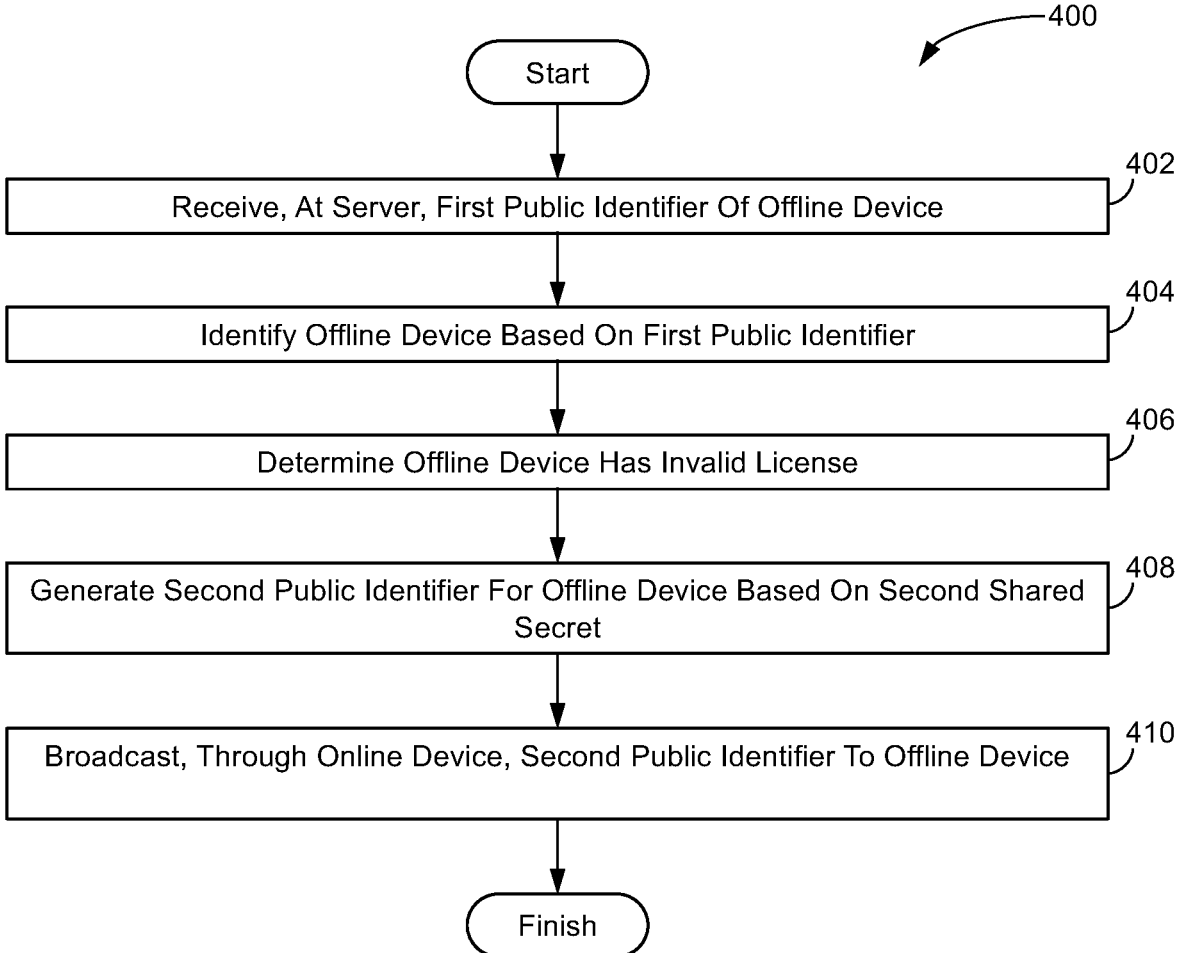
FIG. 4 illustrates an example flow chart for offline license validation, according to certain aspects of the disclosure.

FIG. 4 an example flow diagram (e.g., process 400) for offline license validation, according to certain aspects of the disclosure. For explanatory purposes, the example process 400 is described herein with reference to FIG. 3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIG. 3.

At step 402, the process 400 may include receiving, at a server, a first public identifier of an offline device. The first public identifier may be associated with a first shared secret between the offline device and the server. The first public identifier detected by an online device and relayed to the server by the online device. Step 402 may be performed by one or more hardware processors configured by machine-readable instructions including a module that is the same as or similar to identifier receiving module 308, according to certain aspects of the disclosure.

At step 404, the process 400 may include identifying the offline device based on the first public identifier. Step 404 may be performed by one or more hardware processors configured by machine-readable instructions including a module that is the same as or similar to device identifying module 310, according to certain aspects of the disclosure.

At step 406, the process 400 may include determining the offline device has an invalid license. Step 406 may be performed by one or more hardware processors configured by machine-readable instructions including a module that is the same as or similar to device determination module 312, according to certain aspects of the disclosure.

At step 408, the process 400 may include generating a second public identifier for the offline device based on a second shared secret. Step 408 may be performed by one or more hardware processors configured by machine-readable instructions including a module that is the same as or similar to identifier generating module 314, according to certain aspects of the disclosure.

At step 410, the process 400 may include broadcasting, through the online device, the second public identifier to the offline device. The offline device may deactivate the invalid license upon receipt of the second public identifier. Step 410 may be performed by one or more hardware processors configured by machine-readable instructions including a module that is the same as or similar to device broadcasting module 316, according to certain aspects of the disclosure.

Figure 5:
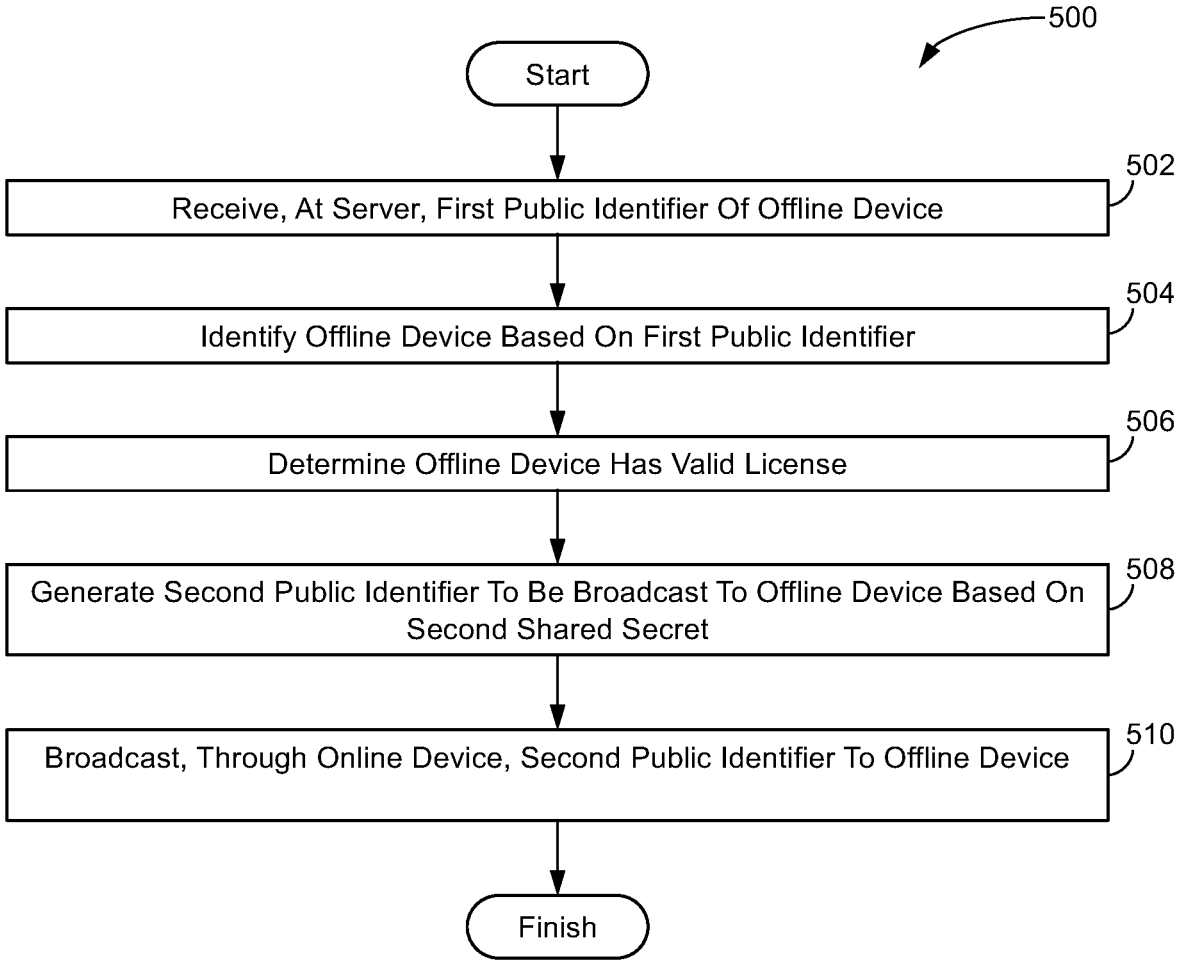
FIG. 5 illustrates an example flow chart for offline license validation, according to certain aspects of the disclosure.

FIG. 5 an example flow diagram (e.g., process 500) for offline license validation, according to certain aspects of the disclosure. For explanatory purposes, the example process 500 is described herein with reference to FIG. 3. Further for explanatory purposes, the steps of the example process 500 are described herein as occurring in serial, or linearly. However, multiple instances of the example process 500 may occur in parallel. For purposes of explanation of the subject technology, the process 500 is discussed in reference to FIG. 3.

At step 502, the process 500 may include receiving, at a server, a first public identifier of an offline device. The first public identifier may be associated with a first shared secret between the offline device and the server. The first public identifier detected by an online device and relayed to the server by the online device. Step 502 may be performed by one or more hardware processors configured by machine-readable instructions including a module that is the same as or similar to identifier receiving module 308, according to certain aspects of the disclosure.

At step 504, the process 500 may include identifying the offline device based on the first public identifier. Step 504 may be performed by one or more hardware processors configured by machine-readable instructions including a module that is the same as or similar to device identifying module 310, according to certain aspects of the disclosure.

At step 506, the process 500 may include determining the offline device has a valid license. Step 506 may be performed by one or more hardware processors configured by machine-readable instructions including a module that is the same as or similar to device determination module 312, according to certain aspects of the disclosure.

At step 508, the process 500 may include generating a second public identifier to be broadcast to the offline device based on a second shared secret. Step 508 may be performed by one or more hardware processors configured by machine-readable instructions including a module that is the same as or similar to identifier generating module 314, according to certain aspects of the disclosure.

At step 510, the process 500 may include broadcasting, through the online device, the second public identifier to the offline device. The offline device may activate the valid license upon receipt of the second public identifier. Step 510 may be performed by one or more hardware processors configured by machine-readable instructions including a module that is the same as or similar to device broadcasting module 316, according to certain aspects of the disclosure.

Figure 6:
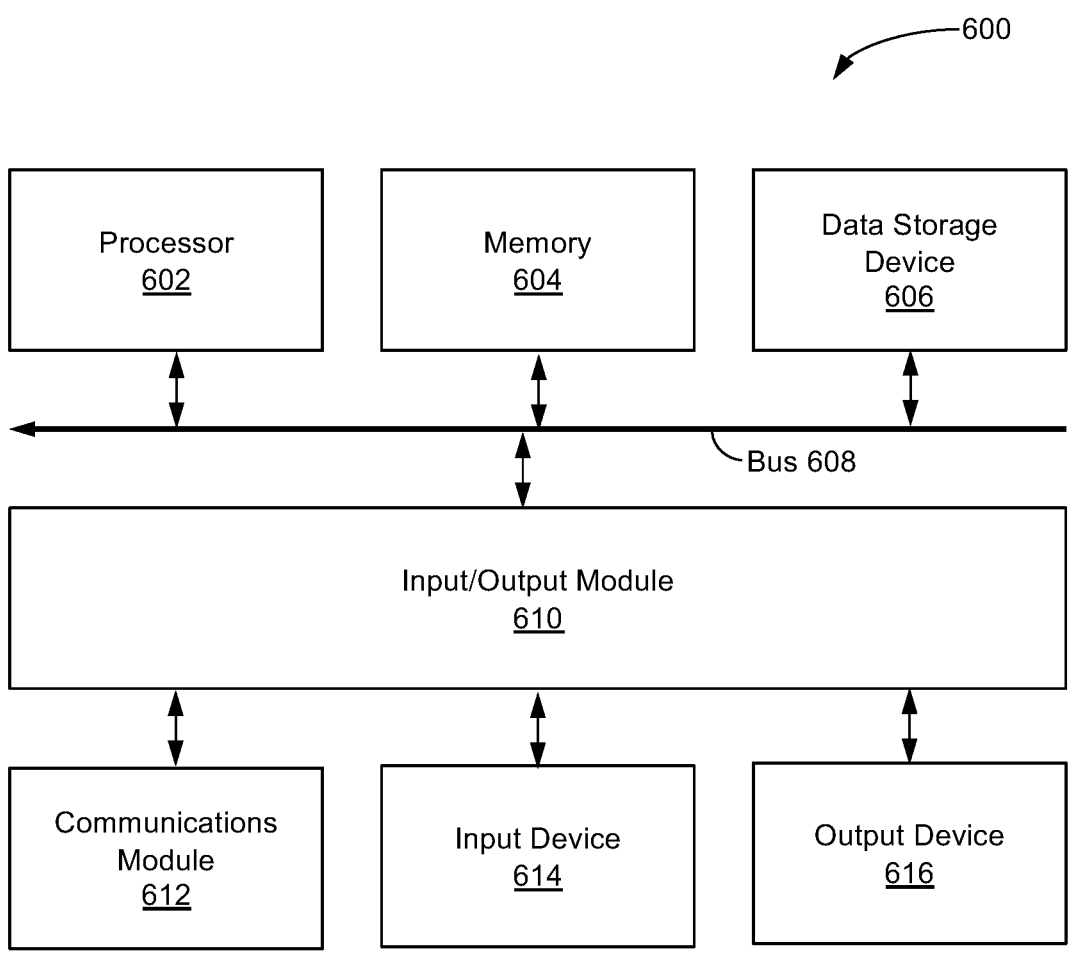
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network or the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method for offline license validation, the method comprising:

exchanging, at a server, a first shared secret and a second shared secret with a first device; and when the first device disables an online access and becomes offline:

receiving, at the server, a first public identifier of the first device, the first public identifier associated with the first shared secret between the first device and the server, the first public identifier detected by an online device and relayed to the server by the online device;

identifying the first device based on the first public identifier;

determining, at the server, the first device has an invalid license based on the first public identifier;

generating, at the server, a second public identifier for the first device based on the second shared secret;

transmitting, to the online device, the second public identifier for broadcasting by the online device to the first device over a local network connection connecting the online device and the first device that has become offline; and deactivating, through the first device, the invalid license when an identifier independently determined at the first device, based on the second shared secret, matches the second public identifier.

2. The method of claim 1, further comprising generating the first public identifier as a universally unique identifier.

3. The method of claim 2, further comprising determining the first device is operating a premium service as indicated by a prefix of the universally unique identifier, wherein a remainder of the universally unique identifier is based on the first shared secret.

4. The method of claim 2, further comprising scanning, through the online device, for universally unique identifiers broadcast by the first device, wherein the online device only submits the universally unique identifier to the server for license validation responsive to a matching universally unique identifier being discovered.

5. The method of claim 1, further comprising:

activating, through the first device, a valid license when the second public identifier independently determined in the first device matches the second public identifier through the online device.

6. The method of claim 5, further comprising continuing to scan, through the first device, until the second public identifier determined by the first device matches the second public identifier through the online device.

7. The method of claim 1, further comprising:

sharing, at the server, at least the first shared secret and the second shared secret with the online device; and sharing, at the server, at least a different first secret and a different second secret with the first device.

8. The method of claim 1, further comprising requiring the first device to enable wireless communications if the first device is subscribed to a premium license.

9. The method of claim 1, wherein the first device is not required to enable wireless communications if the first device is subscribed to a free license, wherein the online device is configured to scan for offline devices regardless of whether the offline device is using a free license or a premium license, wherein the second public identifier is an updated public identifier, the updated public identifier only broadcast by the online device if the free license or the premium license is not valid.

10. The method of claim 1, further comprising continuing to scan, through the online device, responsive to a valid license.

11. A method for offline license validation, the method comprising:

exchanging, at a server, a first shared secret and a second shared secret with a first device; and when the first device disables an online access and becomes offline:

receiving, at the server, a first public identifier of the first device, the first public identifier associated with the first shared secret between the first device and the server, the first public identifier detected by an online device and relayed to the server by the online device;

identifying the first device based on the first public identifier;

determining, at the server, the first device has an invalid license based on the first public identifier;

generating, at the server, a second public identifier to be broadcast to the first device based on the second shared secret;

transmitting, to the online device, the second public identifier for broadcasting by the online device to the first device over a local network connection connecting the online device and the first device that has become offline; and activating, through the first device, the valid license when an identifier independently determined at the first device, based on the second shared secret, matches the second public identifier.

12. The method of claim 11, wherein the server enables the first device to activate a premium license without an online connection based on validation of the premium license by the server.

13. The method of claim 11, further comprising:

generating the first public identifier as a universally unique identifier;

determining the first device is operating a premium service as indicated by a prefix of the universally unique identifier, wherein a remainder of the universally unique identifier is based on the first shared secret; and scanning, through the online device, for universally unique identifiers broadcast by the first device, wherein the online device only submits the universally unique identifier to the server for license validation responsive to a matching universally unique identifier being discovered.

14. The method of claim 11, further comprising:

independently determining, through the first device, the second public identifier based on the second shared secret; and activating, through the first device, the valid license responsive to independently determining the second public identifier by the first device matches the second public identifier.

15. The method of claim 14, further comprising continuing to scan, through the first device, until the second public identifier matches the second public identifier.

16. The method of claim 11, further comprising:

sharing, at the server, at least the first shared secret and the second shared secret with the online device; and sharing, at the server, at least a different first secret and a different second secret with the first device.

17. The method of claim 11, further comprising requiring the first device to enable wireless communications if the first device is subscribed to a premium license.

18. The method of claim 11, wherein the first device is not required to enable wireless communications if the first device is subscribed to a free license, wherein the online device is configured to scan for devices regardless of whether the first device is using a free license or a premium license.

19. The method of claim 11, further comprising continuing to scan, through the online device, responsive to an invalid license.

20. A system configured for offline license validation, the system comprising:

a processor; and a memory comprising instructions stored thereon, which when executed by the processor, cause the processor to perform:

exchanging, at a server, a first shared secret and a second shared secret with a first device; and when the first device disables an online access and becomes offline:

receiving, at the server, a first public identifier of the first device, the first public identifier associated with the first shared secret between the first device and the server, the first public identifier detected by an online device and relayed to the server by the online device;

identifying the first device based on the first public identifier;

determining, at the server, the first device has an invalid license based on the first public identifier;

determining, at the server, the first device has a valid license based on the first public identifier;

generating, at the server, a second public identifier for the first device based on the second shared secret;

transmitting, to the online device, the second public identifier for broadcasting by the online device to the first device over a local network connection connecting the online device and the first device that has become offline; and when an identifier independently determined at the first device, based on the second shared secret, matches the second public identifier, deactivating, through the first device, the invalid license and activating the valid license upon receipt of the second public identifier.

* * * * *